United States Patent
Yoo et al.

(10) Patent No.: US 7,456,883 B2
(45) Date of Patent: Nov. 25, 2008

(54) METHOD FOR DISPLAYING IMAGE IN PORTABLE DIGITAL APPARATUS AND PORTABLE DIGITAL APPARATUS USING THE METHOD

(75) Inventors: Hyun-soo Yoo, Seongnam-si (KR); Kun-sop Kim, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 866 days.

(21) Appl. No.: 10/888,202

(22) Filed: Jul. 9, 2004

(65) Prior Publication Data

US 2005/0083426 A1    Apr. 21, 2005

(30) Foreign Application Priority Data

Oct. 20, 2003    (KR) ............. 10-2003-0072984

(51) Int. Cl.
  *H04N 5/222*    (2006.01)
(52) U.S. Cl. .................. 348/305; 348/333.12
(58) Field of Classification Search .............
  348/333.01–333.05, 333.11–333.12
See application file for complete search history.

(56) References Cited

U.S. PATENT DOCUMENTS

| 5,905,530 | A | 5/1999 | Yokota et al. |
| 6,310,648 | B1* | 10/2001 | Miller et al. ............ 348/333.05 |
| 7,206,804 | B1* | 4/2007 | Deshpande et al. ......... 709/203 |

\* cited by examiner

*Primary Examiner*—Tuan V Ho
(74) *Attorney, Agent, or Firm*—Drinker Biddle & Reath LLP

(57) ABSTRACT

The present invention provides a method for displaying a digital image on a portable digital apparatus having a recording medium, a display panel, a zoom button, and a location move button. The method includes displaying an original image stored in the recording medium on the entire display area of the display panel; displaying a thumbnail image obtained by reducing the display size of the original image on part of the display area of the display panel; displaying within the thumbnail image a window mark indicating the portion of the original image being displayed on the entire display area; enlarging or reducing the displayed portion of the original image and the window mark according to signals from the zoom button; and changing the location of the displayed portion of the original image and the location of the window mark within the thumbnail image, according to signals from the location move button.

23 Claims, 6 Drawing Sheets

METHOD FOR DISPLAYING IMAGE IN PORTABLE DIGITAL APPARATUS AND PORTABLE DIGITAL APPARATUS USING THE METHOD

BACKGROUND OF THE INVENTION

This application claims the priority of Korean Patent Application No. 2003-72984, filed on Oct. 20, 2003, in the Korean Intellectual Property Office, the disclosure of which is incorporated herein in its entirety by reference.

1. Field of the Invention

The present invention relates to a method for displaying an image in a portable digital apparatus and a portable digital apparatus using the method, and more particularly, to a method for displaying an image stored in a recording medium, on a display panel in a portable digital apparatus having the recording medium, the display panel, a zoom button, and a location move button, and a portable digital apparatus using the method.

2. Description of the Related Art

A conventional portable digital apparatus, such as the Samsung Techwin digital camera with model name Digimax 350SE™, includes a recording medium, a display panel, zoom buttons, and location move buttons. Images obtained in the picture taking mode of such a digital camera are stored in the recording medium. In the image play mode, an image selected by a user is displayed on the display panel. By manipulating zoom buttons, the user may enlarge or reduce an image as it is displayed, and by manipulating location move buttons, the user may change the location of a displayed image.

In conventional methods, a white box, which represents the entire image area, is displayed on a portion of the display panel while a block box indicating the portion of the image currently displayed on the display panel is displayed within the white box. Accordingly, the user can roughly recognize the location of the image currently displayed on the display panel, but may not recognize this quickly and clearly.

According to LG Electronics's camera-phone with model name LP2100™, an original image and a thumbnail image can be simultaneously displayed. The thumbnail image is obtained by reducing the display size of the original image.

SUMMARY OF THE INVENTION

The present invention provides a display method and a portable digital apparatus by which a user of a portable digital apparatus can quickly and clearly recognize what portion of an image is currently being displayed on the display panel, when the user reproduces an image file and at the same time performs a zoom function According to an aspect of the present invention, there is provided a display method for displaying an image stored in a recording medium, on a display panel in a portable digital apparatus with the recording medium, the display panel, a zoom button, and a location move button, the method including: displaying an original image stored in the recording medium, on the entire display area of the display panel; displaying a thumbnail image obtained by reducing the display size of the original image, on part of the display area of the display panel; displaying a window mark indicating the range of an image displayed on the entire display area, in the thumbnail image; enlarging or reducing the original image and the window mark according to signals from the zoom button and displaying; and moving the original image and the window mark according to signals from a location move button and displaying.

According to the display method, while the thumbnail image is fixedly displayed, the window mark in the thumbnail image is adaptively displayed. Accordingly, when the user of the portable digital apparatus reproduces the image file and performs a zooming function, the user can quickly and clearly recognize the location of the image.

A portable digital apparatus of the present invention uses the method of the present invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
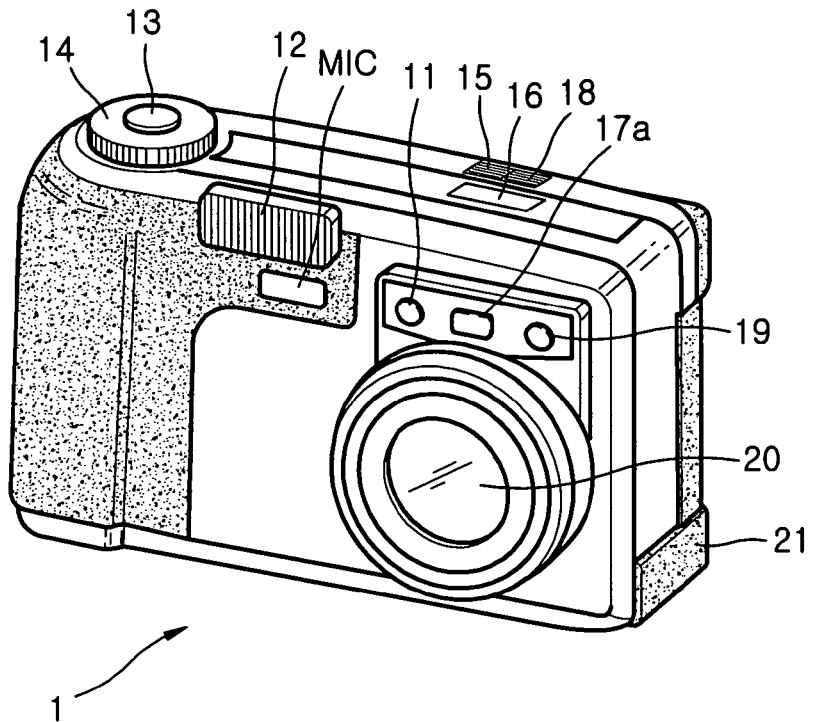
FIG. 1 is a perspective view showing the front and top of a digital camera as a portable digital apparatus according to the present invention.

Referring to FIG. 1, on the front part of a digital camera that is a portable digital apparatus according to the present invention, there are a microphone MIC, a self-timer lamp 11, a flash 12, a shutter button 13, a mode dial 14, a function-selection button 15, a shooting-information display unit 16, a viewfinder 17A, a function-block button 18, a flash-light amount sensor 19, a lens unit 20, and an external interface unit 21.

The self-timer lamp 11 in self-timer mode operates for a set time between the pressing of the shutter button 13 to the operation of the shutter. The mode dial 14 is used by a user to select and set a variety of modes, such as still image shot mode, night scene mode, moving picture mode, play mode, computer connection mode, and system setting mode. The function-selection button 15 is used to select one of the operation modes of the digital camera 1, such as still image shot mode, night scene mode, moving picture mode, and play mode. The shooting-information display unit 16 displays information on each function related to shooting. The function-block button 18 is used to select each function displayed on the shooting-information display unit 16.

Figure 2:
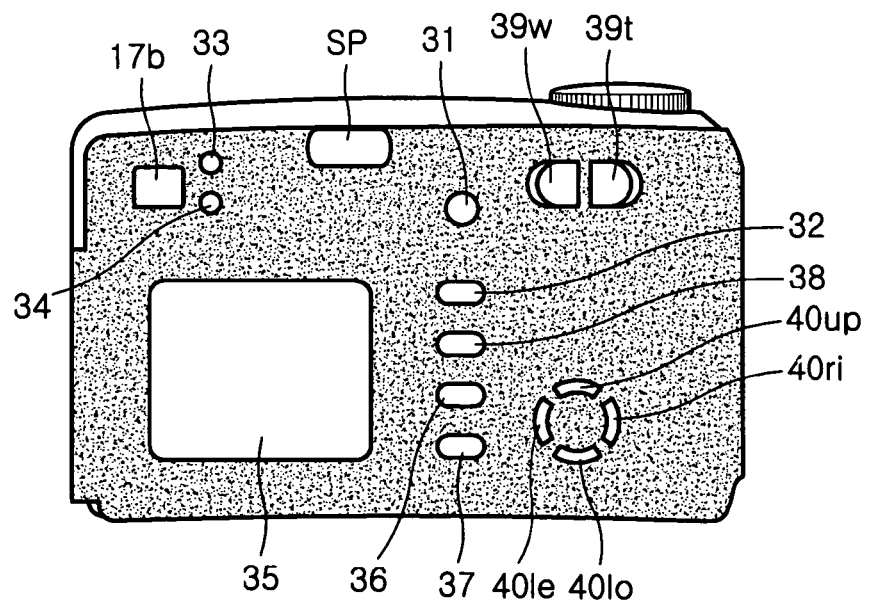
FIG. 2 is a back view showing the back of the digital camera of FIG. 1.

Referring to FIG. 2, at the back of the digital camera 1 of the present invention there are a speaker SP, a power button 31, a monitor button 32, an autofocus lamp 33, a viewfinder 17B, a flash wait lamp 34, a display panel 35, a confirm/delete button 36, an enter/play button 37, a menu button 38, a wide angle-zoom button 39*w*, a telephoto-zoom button 39*t*, a move-up button 40*up*, a move-right button 40*ri*, a move-down button 40*lo*, and a move-left button 40*le*.

The monitor button 32 allows the user to control the operation of the display panel 35. For example, if the user presses the monitor button 32 once, the image of a subject and its shooting information are displayed on the display panel 35. If the user presses the monitor button 32 a second time, only the image of the subject is displayed on the display panel 35. If the user presses the monitor button 32 a third time, the power provided to the display panel 35 is cut off. The autofocus lamp 33 lights up when camera focus is well adjusted. The flash wait lamp 34 operates when the flash 12 of FIG. 1 is in a wait state. The confirm/delete button 36 is used as a confirm button or a delete button in any process in which the user sets a mode. The enter/play button 37 is used for inputting data from the user, and for stopping or playing in play mode. The menu button 38 is used to display the menu of a mode selected with the mode dial 14. The move-up button 40*up*, the move-right button 40*ri*, the move-down button 40*lo*, and the move-left button 40*le* are also used by the user in setting each mode.

Figure 3:
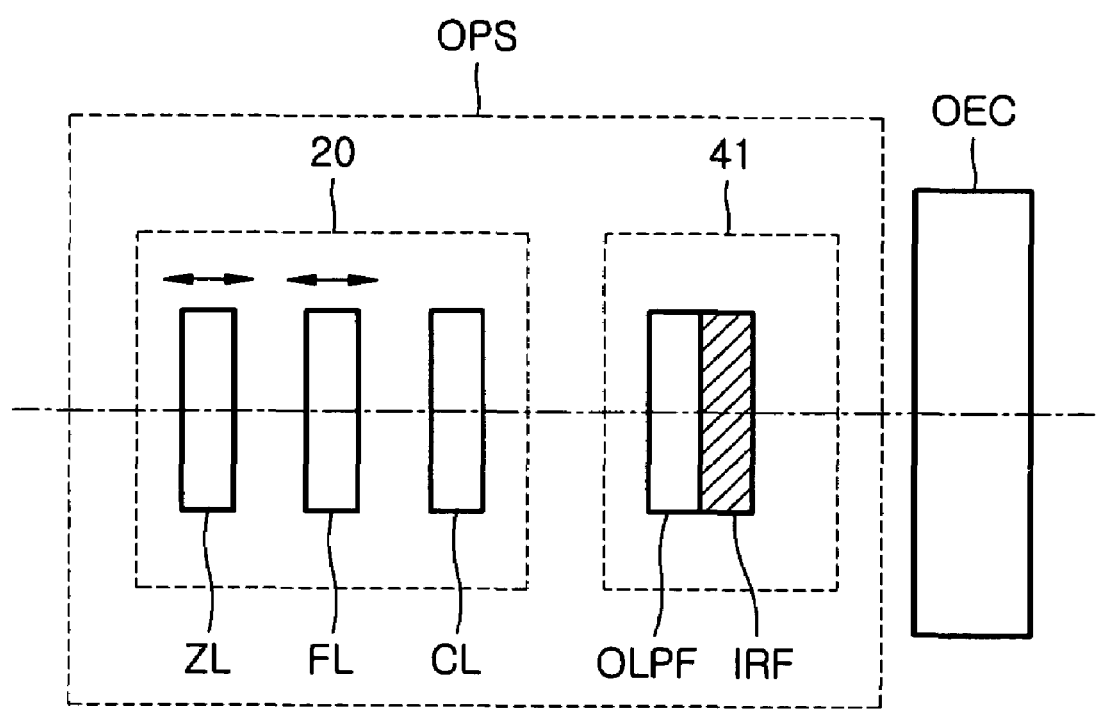
FIG. 3 is the structure of the incident side of the digital camera of FIG. 1.
Figure 4:
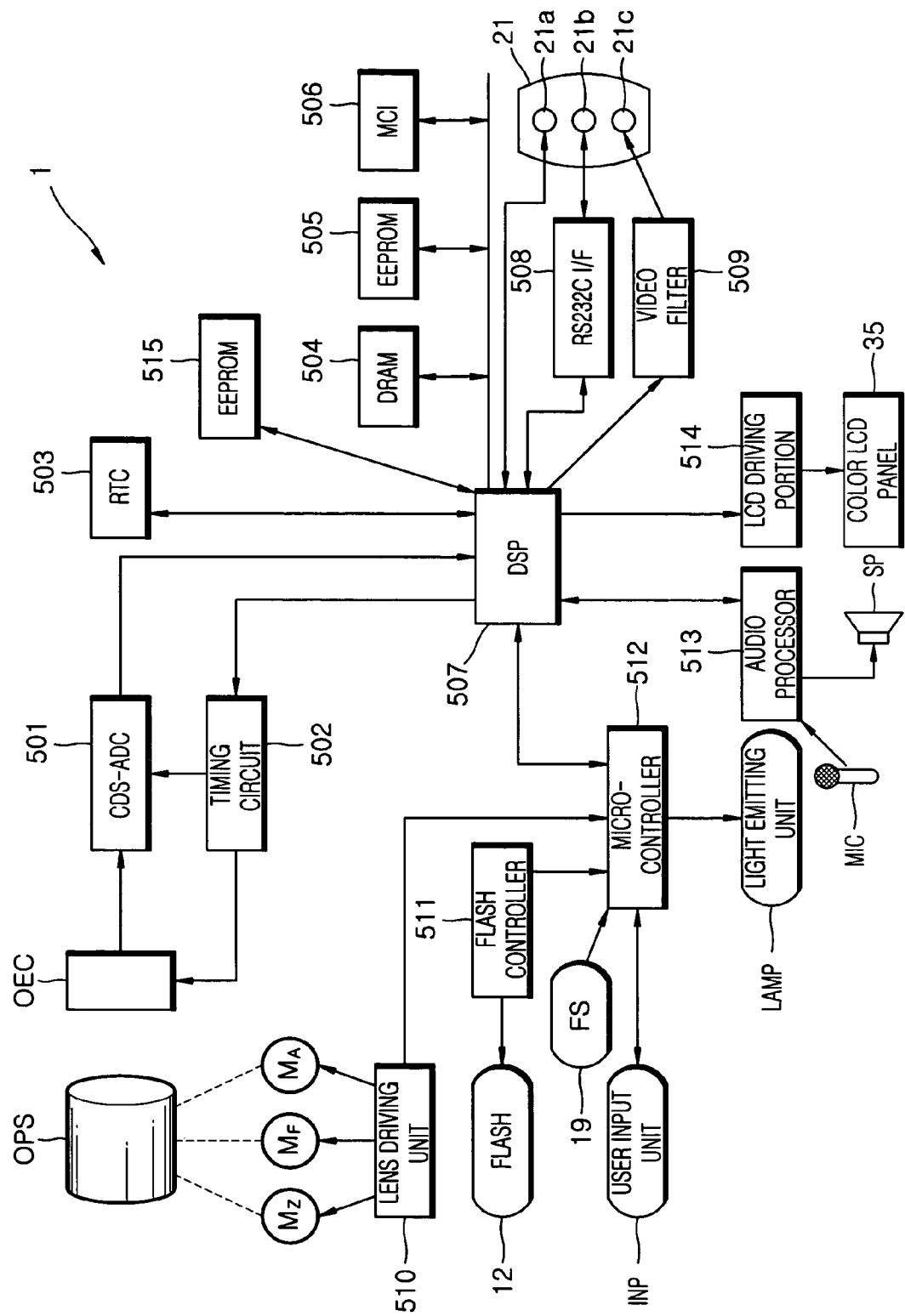
FIG. 4 is a block diagram showing the entire structure of the digital camera of FIG. 1.

FIG. 3 is the structure of the light incident side of the digital camera of FIG. 1. FIG. 4 is a block diagram showing the entire structure of the digital camera of FIG. 1. Referring to FIGS. 1 through 4, the entire structure and operation of the digital camera of FIG. 1 will now be explained.

An optical system OPS including a lens unit 20 and a filter unit 41 optically processes light from a subject.

The lens unit 20 of the optical system OPS includes a zoom lens ZL, a focus lens FL, and a compensation lens CL.

If the user presses the wide angle-zoom button 39W or telephoto-zoom button 39 included in a user input unit INP, a signal corresponding to this is input to a microcontroller 512. Accordingly, the microcontroller 512 controls a lens driving unit 510 such that a zoom motor $M_Z$ operates and in turn the zoom lens ZL moves. That is, if the wide angle-zoom button 39W is pressed, the focal length of the zoom lens ZL becomes shorter and the angle of view becomes wider, and if the telephoto-zoom button 39T is pressed, the focal length of the zoom lens ZL becomes longer and the angle of view becomes narrower. Here, since the position of the focus lens FL is adjusted with the position of the zoom lens ZL set, the angle of view is hardly affected by the position of the focus lens FL.

Meanwhile, when the focus on the subject is automatically or manually adjusted, the current position of the focus lens FL varies with respect to the position of the subject. Accordingly, the microcontroller 512 can obtain the subject distance that is the distance between the subject and the focus lens FL, from design data of the optical system OPS. In autofocus mode, a focus motor $M_F$ is driven by the microcontroller 512 controlling the lens driving unit 510. Accordingly, the focus lens FL moves from a frontmost position to a backmost position, and in this process, a position of the focus lens FL where the high frequency component of an image signal becomes a maximum, for example, the number of driving steps of the focus motor $M_F$, is set.

Since the compensation lens CL plays a role to compensate the entire refraction ratio, it is not driven additionally. Reference character $M_A$ indicates a motor to drive an aperture (not shown).

In the filter unit 41 of the optical system OPS, an optical low pass filter OLPF removes optical noise of a high frequency component. An infrared cut filter IRF cuts of the infrared component of incident light.

An optoelectronic conversion unit OEC of a charge coupled device (CCD) or a complementary metal-oxide semiconductor (CMOS) converts light from the optical system OPS into an electric analog signal. Here, a digital signal processor 507 controls a timing circuit 502 so as to control operations of the optoelectronic conversion unit OEC and the analog-digital conversion unit 501. A correlation double sampler and analog-to-digital converter (CDS-ADC) part 501 as the analog-to-digital conversion unit processes an analog signal from the optoelectronic conversion unit OEC such that the high frequency noise in the signal is removed, the amplitude of the signal is adjusted, and the analog signal is converted into a digital signal. The digital signal processor 507 operated by the control of the microcontroller 512 processes the digital signal from the CDS-ADC unit 501 and generates a digital image signal classified into luminance and chromaticity signals.

A light emitting unit LAMP driven by the microcontroller 512 includes the self-timer lamp 11, the autofocus lamp 33, and the flash wait lamp 34. The user input unit INP includes the shutter button 13, the mode dial 14, the function-selection button 15, the function-block button 18, the monitor button 32, the confirm/delete button 36, the enter/play button 37, the menu button 38, the wide angle-zoom button 39*w*, the telephoto-zoom 39*t*, the move-up button 40*up*, the move-right button 40*ri*, the move-down button 40*lo*, and the move-left button 40*le*.

In a dynamic random access memory (DRAM) 504, a digital image signal from the digital signal processor 507 is temporarily stored. In an erasable programmable read only memory (EPROM) 505, algorithms and set data required for operations of the digital signal processor 507 are stored. In a memory card interface 506, a memory card of the user is attached or detached.

The digital image signal form the digital signal processor 507 is input to an LCD driving unit 514 such that an image is displayed on the color LCD panel 35.

Meanwhile, the digital image signal from the digital signal processor can be transmitted in serial communication through a universal serial bus (USB) connection unit 21A or an RS232C interface 508 and its connection unit 21B, or may be transmitted as a video signal through a video filter 509 and a video output unit 21C. Here, the digital signal processor 507 internally has a microcontroller.

An audio processor 513 outputs a voice signal from the microphone MIC to the digital signal processor 507 or the speaker SP, and an audio signal from the digital signal processor 507 to the speaker SP.

Meanwhile, the microcontroller 512 controls the operation of a flash controller 511 according to a signal from the flashlight amount sensor 19 so as to drive the flash 12.

Figure 5:
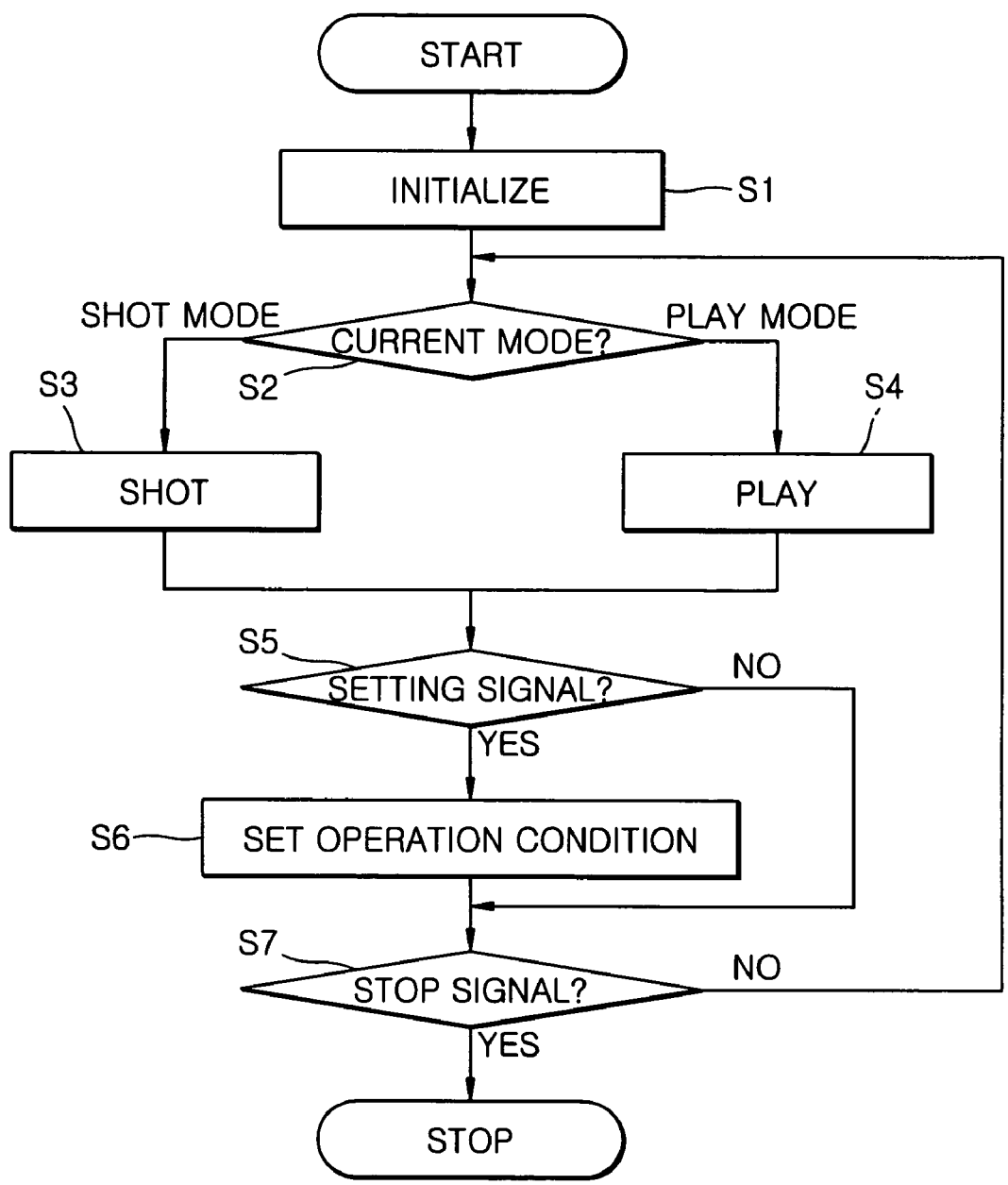
FIG. 5 is a flowchart showing a main algorithm of a digital signal processor of FIG. 4.

Referring to FIG. 5, the main algorithm of the digital signal processor 507 of FIG. 4 will now be explained.

If operational power is provided to the digital camera 1, the digital signal processor 507 performs initialization in step S1. If the initialization step S1 is performed, the subsequent steps are performed depending on the current mode determined in step S2.

If a shot mode signal is generated from the function-selection button 15 in the user input unit INP, the digital signal processor performs shooting control in step S3. Here, the shot mode signal refers to any one of still image shot mode, night scene mode, and moving picture mode.

Meanwhile, if a play mode signal is generated from the function-selection button 15 in the user input unit INP, the digital signal processor 507 performs reproduction control in step S4. The algorithm for this play control will be explained in more detail later with reference to FIGS. 6 through 7B.

If a signal to set camera operation conditions is input from the mode dial 14 in the user input unit INP when the shooting step S3 or the play step S4 is performed, the digital signal processor 507 sets operational conditions of each mode in step S6. For example, operational conditions of still image shot mode, night scene mode, moving picture mode, play mode, computer connection mode, or system setting mode are set.

All the above steps are repeatedly performed until a stop signal is input from the outside in step S7.

Figure 6:
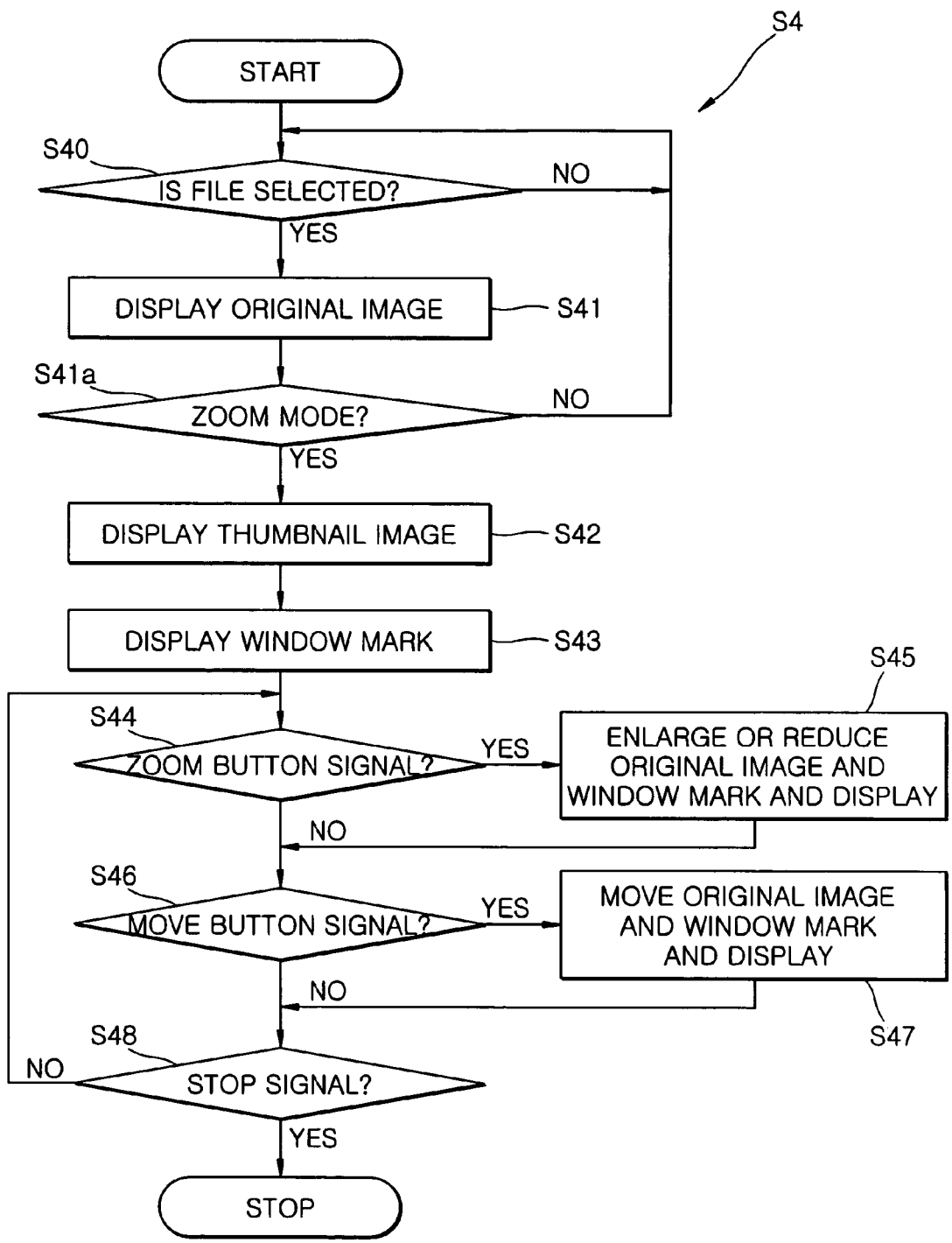
FIG. 6 is a flowchart showing an algorithm of a reproducing step of FIG. 5

FIG. 6 is a flowchart showing an algorithm of the reproducing step S4 of FIG. 5.

Figure 7A:
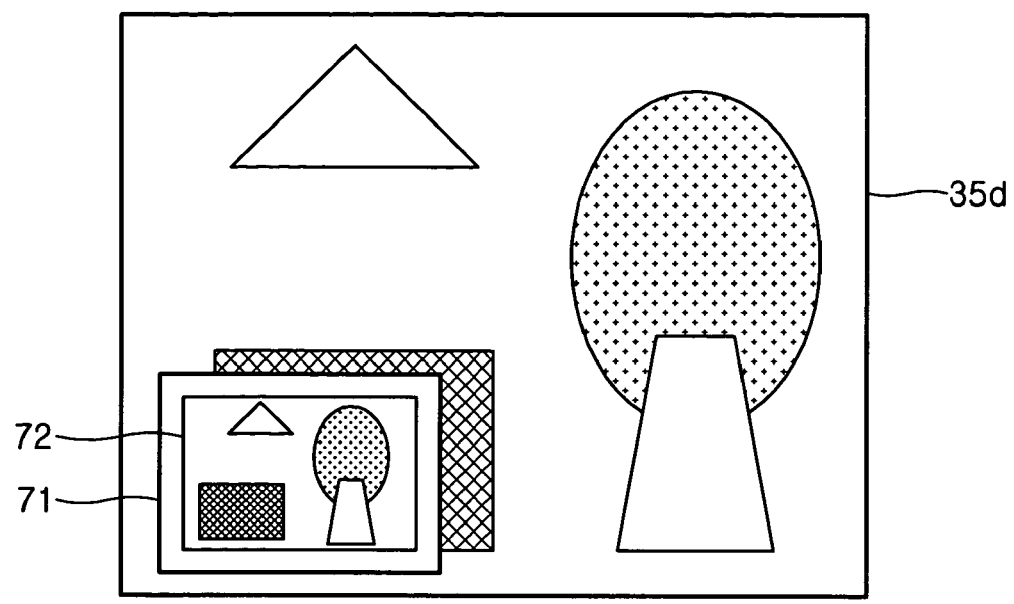
FIG. 7A is a diagram showing objects displayed on the display area of a color LCD panel when step S43 of FIG. 6 is performed.
Figure 7B:
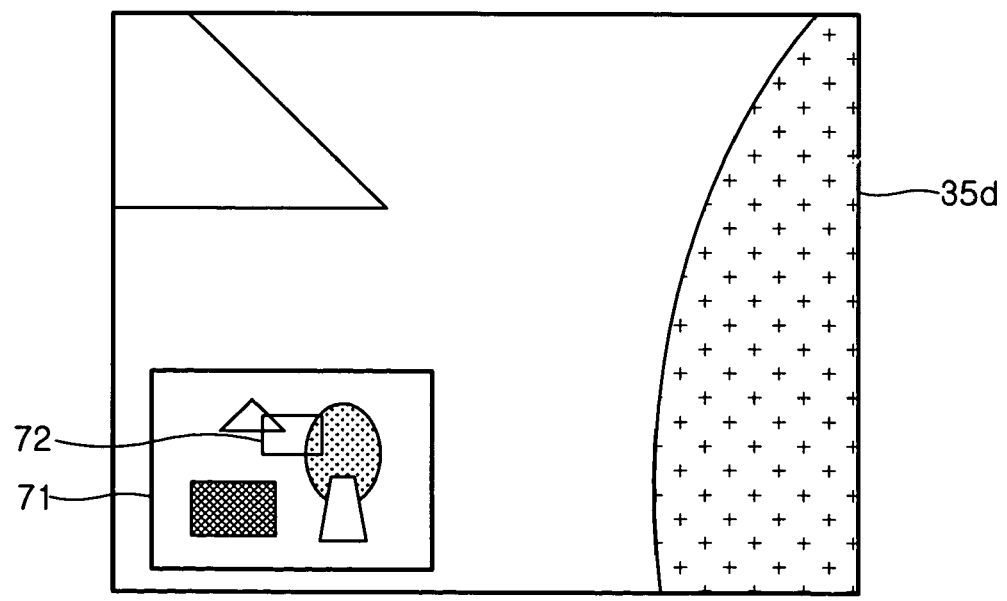
FIG. 7B is a diagram showing objects displayed on the display area of a color LCD panel when step S45 or S47 of FIG. 6 is performed.

FIG. 7A is a diagram showing objects displayed on the display area 35d of the color LCD panel 35 of FIGS. 2 and 4 when step S43 of FIG. 6 is performed. FIG. 7B is a diagram showing objects displayed on the display area 35d of the color LCD panel 35 when step S45 or S47 of FIG. 6 is performed. Referring to FIGS. 4 and 6 through 7B, the algorithm of the play step S4 of FIG. 5 will now be explained.

First, if an image file to be reproduced is selected by the user in step S40, the digital signal processor 507 displays the original image stored in the recording medium, i.e. the memory card, on the entire display area 35d of the color LCD panel 35 in step S41. Then, in step S41A, if a zoom mode is confirmed by a signal input from the zoom buttons 39w or 39t of FIG. 2, or a separate button (not shown) in the user input unit INP, the digital signal processor 507 performs the following steps or else performs the steps S40 and S41 repeatedly.

First, a thumbnail image 71 obtained by reducing the display size of the original image is displayed on part of the display area 35d in step S42. Next, the digital signal processor 507 displays a window mark 72 indicating the portion of the original image that is displayed on the entire display area 35d, in the thumbnail image 71 in step S43 (refer to FIG. 7A).

Next, according to signals from the zoom buttons 39W and 39T of FIG. 2 in the user input unit INP, the digital signal processor 507 enlarges or reduces the displayed portion of the original image and the window mark 72 and displays in steps S44 and S45 (Refer to FIG. 7B). (Reducing the size of the displayed portion of the original image corresponds to 'zooming in.' Increasing the size of the displayed portion corresponds to 'zooming out.') Here, the proportion by which the window mark 72 is enlarged or reduced is proportionate to the proportion by which the displayed portion of the original image is enlarged or reduced. The proportion by which the window mark 72 is enlarged or reduced may be determined by using the ratio of the current area of the window mark 72 to the entire area of the display area 35d.

Meanwhile, according to signals from location move buttons 40up, 40ri, 40le, and 40lo of FIG. 2 in the user input unit INP, the digital signal processor 507 moves the portion of the original image being displayed and moves the window mark 72 in steps S46 and S47 (Refer to 7B). Here, the distance by which the window mark 72 moves is proportionate to the distance that the displayed portion of the original image moves. The proportion that the window mark 72 moves may be determined according to the ratio of the current area of the window mark 72 to the entire area of the display area 35d.

The steps S44 through S47 are repeatedly performed until a stop signal is input in step S48. That is, according to signals from the zoom buttons 39w and 39t of FIG. 2 in the user input unit INP, the digital signal processor 507 enlarges or reduces the displayed portion of the original image and the window mark 72 in stages. Also, according to signals from location move buttons 40up, 40ri, 40le, and 40lo of FIG. 2 in the user input unit INP, the digital signal processor 507 moves the displayed portion of the original image and the window mark 72 in stages.

If the stop signal is input, the digital signal processor 507 can store the latest enlarged or reduced image in the recording medium, i.e. the memory card, according to user selection or automatically.

As described above, according to the display method and the portable digital apparatus of the present invention, the thumbnail image is fixedly displayed while the window mark in the thumbnail image is adaptively displayed.

Accordingly, when the user of the portable digital apparatus reproduces an image file and at the same time performs a zoom function, the user can quickly and clearly recognize the portion of the original image currently displayed in the display area.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for displaying an image on a portable digital apparatus, the method comprising:

displaying a portion of an original image on a display area, wherein the portion may be the entire original image or a fraction thereof;

displaying a thumbnail image of the original image, on a portion of the display area, wherein the thumbnail image is a smaller version of the original image;

displaying a window mark on the thumbnail image, wherein the window mark outlines the portion of the original image that is being displayed on the display area; and increasing or reducing the portion of the original image that is displayed and correspondingly increasing or reducing the size of the window mark based on increasing or decreasing the portion of the original image.

2. The method of claim 1, further comprising:

changing the location of the displayed portion of the original image and the location of the window mark, wherein the change in location of the displayed portion of the original image corresponds to the change in location of the window mark.

3. The method of claim 2, wherein the magnitude of the change in location of the displayed portion of the original image is proportional to the magnitude of the change in location of the window mark.

4. The method of claim 2, wherein the portable digital apparatus comprises an input device that allows a user to change the location of the displayed portion of the original image.

5. The method of claim 1, wherein the displayed portion of the original image is displayed on the entire display area, while allowing for overlapping symbols and images, including the thumbnail image.

6. The method of claim 1, wherein the change in size of the displayed portion of the original image is proportional to the change in size of the window mark.

7. The method of claim 1, wherein the portable digital apparatus is a digital camera.

8. The method of claim 1, wherein the portable digital apparatus comprises a recording medium that stores the original image.

9. The method of claim 1, wherein the portable digital apparatus comprises an input device that allows a user to enlarge the size of the displayed portion of the original image and the size of the window mark.

10. The method of claim 1, wherein the portable digital apparatus comprises an input device that allows a user to reduce the size of the displayed portion of the original image and the size of the window mark.

11. A portable digital apparatus, comprising:
   a recording medium, wherein the recording medium is capable of storing at least one digital image;
   a display area; and
   at least one processor, wherein the processor performs the functions of:
      displaying a portion of an original image on the display area to provide a displayed image, wherein the displayed image may be the entire original image or a fraction thereof,
      displaying a thumbnail image of the original image on a portion of the display area, wherein the thumbnail image is a smaller version of the original image,
      displaying a window mark on the thumbnail image, wherein the window mark outlines the portion of the original image that corresponds to the displayed image, and
      increasing or reducing the size of the displayed image and increasing or reducing the size of the window mark based on increasing or decreasing the size of the displayed image, such that the window mark indicates the portion of the original image that corresponds to the displayed image.

12. The apparatus of claim 11, wherein the processor is a digital signal processor.

13. The apparatus of claim 11, further comprising:
   an input device that allows a user to change the location of the original image that forms the displayed image.

14. The apparatus of claim 11, wherein the change in size of the original image that forms the displayed image is proportional to the change in size of the window mark.

15. The apparatus of claim 11, further comprising:
   an input device that allows a user to enlarge the size of a portion of the original image to form the displayed image and to correspondingly enlarge the size of the window mark.

16. The apparatus of claim 11, further comprising:
   an optical system; and
   a photoelectric conversion unit.

17. The apparatus of claim 11, wherein the processor also performs the function of changing the location of the portion of the original image the forms the displayed image and to the correspondingly change the location of the window mark.

18. The apparatus of claim 17, wherein the magnitude of the change in location of the portion of the original image that forms the displayed image is proportional to the magnitude of the change in location of the window mark.

19. The apparatus of claim 17, further comprising:
   an input device that allows a user to change the location of the displayed portion of the original image.

20. A portable digital apparatus, comprising:
   a means for storing at least one digital image;
   a means for displaying digital images; and
   means for displaying a portion of an original image on the display area, wherein the portion may be the entire original image or a fraction thereof,
   means for displaying a thumbnail image of the original image on a portion of the display area, wherein the thumbnail image is a smaller version of the original image,
   means for displaying a window mark on the thumbnail image, wherein the window mark outlines the portion of the original image that is being displayed on the display area,
   means for increasing or reducing the portion of the original image that is displayed and the size of the window mark, wherein the change in size of the displayed portion of the original image corresponds to the change in size of the window mark based on increasing or decreasing the portion of the original image, and
   means for changing the location of the displayed portion of the original image and the location of the window mark, wherein the change in location of the displayed portion of the original image corresponds to the change in location of the window mark.

21. The method of claim 1, wherein:
   the increasing or reducing step comprises manipulating the size of the portion of the original image that is displayed and, in response, correspondingly increasing or reducing the size of the window mark.

22. The apparatus of claim 11, wherein:
   the increasing or reducing operation comprises enabling a user to manipulate the size of the portion of the original image that is displayed and, in response, correspondingly increasing or reducing the size of the window mark.

23. The apparatus of claim 20, wherein:
   the means for increasing or reducing manipulates the size of the portion of the original image that is displayed and, in response, correspondingly increases or reduces the size of the window mark.

* * * * *